(12) United States Patent
Zhu et al.

(10) Patent No.: US 10,879,990 B1
(45) Date of Patent: Dec. 29, 2020

(54) DYNAMIC BEAM SWITCHING

(71) Applicant: QUALCOMM Incorporated, San Diego, CA (US)

(72) Inventors: Jun Zhu, San Diego, CA (US); Ruhua He, San Diego, CA (US); Yong Li, San Diego, CA (US); Raghu Narayan Challa, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/698,224

(22) Filed: Nov. 27, 2019

(51) Int. Cl.
*H04B 7/08* (2006.01)
*H04J 11/00* (2006.01)
*H04B 17/309* (2015.01)

(52) U.S. Cl.
CPC .......... *H04B 7/088* (2013.01); *H04B 17/309* (2015.01); *H04J 11/0073* (2013.01); *H04J 11/0076* (2013.01); *H04J 11/0079* (2013.01)

(58) Field of Classification Search
CPC ... H04B 7/088; H04B 17/309; H04J 11/0073; H04J 11/0076; H04J 11/0079
See application file for complete search history.

(56) References Cited

U.S. PATENT DOCUMENTS

| 2019/0230544 A1* | 7/2019 | Zhu | H04W 24/10 |
| 2019/0327767 A1* | 10/2019 | Islam | H04W 24/08 |
| 2020/0044709 A1* | 2/2020 | Kang | H04B 17/318 |
| 2020/0162182 A1* | 5/2020 | Zhang | H04J 11/0076 |
| 2020/0195398 A1* | 6/2020 | Futaki | H04W 24/10 |

* cited by examiner

*Primary Examiner* — Jean B Corrielus
(74) *Attorney, Agent, or Firm* — Patterson & Sheridan, L.L.P.

(57) ABSTRACT

Certain aspects of the present disclosure provides a method for wireless communication at a user equipment (UE). In certain aspects, the method includes selecting, for each of a plurality of synchronization signal blocks (SSBs) of a synchronization signal (SS) burst set, one corresponding receive beam of a plurality of receive beams of the UE. In certain aspects, the method also includes monitoring, at each of the plurality of SSBs, for at least one synchronization signal transmitted by at least one base station (BS) using the corresponding selected receive beam.

30 Claims, 10 Drawing Sheets

900

902
SELECT, FOR EACH OF A PLURALITY OF SYNCHRONIZATION SIGNAL BLOCKS (SSBS) OF A SYNCHRONIZATION SIGNAL (SS) BURST SET, ONE CORRESPONDING RECEIVE BEAM OF A PLURALITY OF RECEIVE BEAMS OF THE UE

904
MONITOR, AT EACH OF THE PLURALITY OF SSBS, FOR AT LEAST ONE SYNCHRONIZATION SIGNAL TRANSMITTED BY AT LEAST ONE BASE STATION (BS) USING THE CORRESPONDING SELECTED RECEIVE BEAM

DYNAMIC BEAM SWITCHING

BACKGROUND

Field of the Disclosure

Aspects of the present disclosure relate to wireless communications, and more particularly, to techniques for a user equipment (UE) to monitor synchronization signal blocks (SSBs) during a scheduled synchronization signal (SS) burst set.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. The method generally includes selecting, for each of a plurality of synchronization signal blocks (SSBs) of a synchronization signal (SS) burst set, one corresponding receive beam of a plurality of receive beams of the UE, and monitoring, at each of the plurality of SSBs, for at least one synchronization signal transmitted by at least one base station (BS) using the corresponding selected receive beam.

Certain aspects provide a user equipment (UE) that includes a memory and a processor communicatively coupled to the memory. In certain aspects, the processor is configured to: select, for each of a plurality of synchronization signal blocks (SSBs) of a synchronization signal (SS) burst set, one corresponding receive beam of a plurality of receive beams of the UE, and monitor, at each of the plurality of SSBs, for at least one synchronization signal transmitted by at least one base station (BS) using the corresponding selected receive beam.

Certain aspects provide an apparatus for wireless communication. In certain aspects, the apparatus includes means for selecting, for each of a plurality of synchronization signal blocks (SSBs) of a synchronization signal (SS) burst set, one corresponding receive beam of a plurality of receive beams of the UE, and means for monitoring, at each of the plurality of SSBs, for at least one synchronization signal transmitted by at least one base station (BS) using the corresponding selected receive beam.

A non-transitory computer-readable storage medium that stores instructions that when executed by a processor of an apparatus cause the apparatus to perform a method of wireless communication, comprising: selecting, for each of a plurality of synchronization signal blocks (SSBs) of a synchronization signal (SS) burst set, one corresponding receive beam of a plurality of receive beams of the UE, and monitoring, at each of the plurality of SSBs, for at least one synchronization signal transmitted by at least one base station (BS) using the corresponding selected receive beam.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
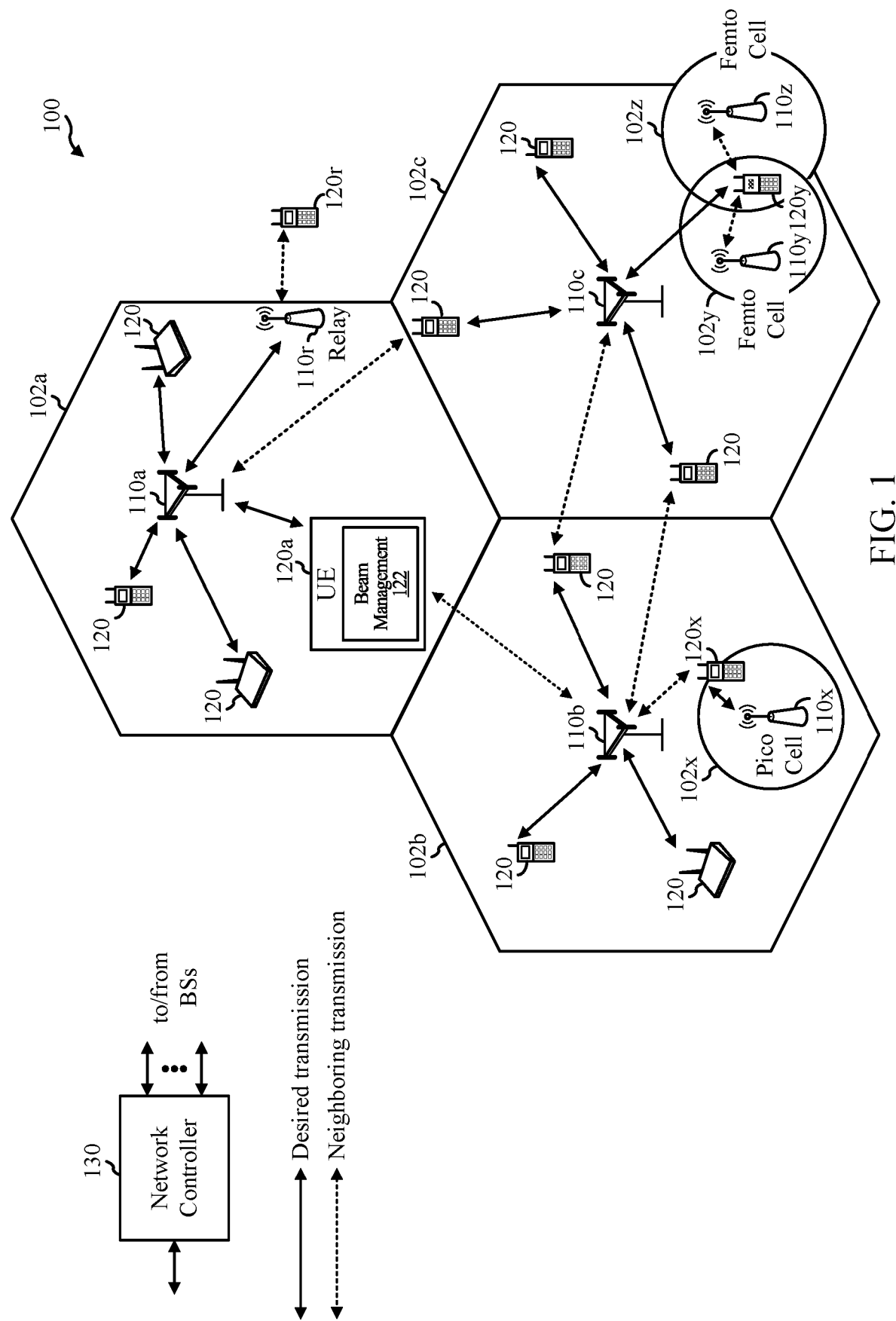
FIG. 1 is a block diagram conceptually illustrating an example telecommunications system, in accordance with certain aspects of the present disclosure.

Aspects of the present disclosure provide apparatus, methods, processing systems, and computer readable mediums for switching, by a user equipment (UE), receive beams to support signal measurement on a per synchronization signal block (SSB) basis. In some embodiments, one or more base stations (BSs) may be configured to transmit SSBs in a plurality of different beams in a time-multiplexed manner. Such transmissions may include "SS burst sets." In some cases, multiple BSs may form a synchronization network, whereby all BSs in the network utilize frame/slot synchronization in order to reduce interference between downlink and uplink transmissions. That is, in a synchronized network of multiple BSs, each BS may be time-synchronized with other BSs in the network to transmit SS burst sets at a scheduled time. As described in this disclosure, methods and techniques are provided to allow a UE to receive and measure on multiple SSBs from one or more BSs during a single SS burst set.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). As shown, a user equipment (UE) 120a may be communicating with a first BS 110a. That is, the first BS 110a is representative of a serving cell 102a for the UE 120a. The UE 120a may also be within range of a neighboring cell 102b, and may receive signaling from a second BS 110b. In some examples, the first BS 110a and the second BS 110b form a synchronized network.

As shown in FIG. 1, the UE 120a includes a beam management 122 module that may be configured for selecting, for each of a plurality of synchronization signal blocks (SSBs) of a synchronization signal (SS) burst set, one corresponding receive beam of a plurality of receive beams of the UE, meaning a different receive beam may be selected for each SSB, and monitoring, at each of the plurality of SSBs, for at least one synchronization signal transmitted by at least one BS (e.g., one or more of the first BS 110a or the second BS 110b) using the corresponding selected receive beam, according to aspects described herein.

As illustrated in FIG. 1, the wireless communication network 100 may include a number of BSs 110 and other network entities. A BS may be a station that communicates with user equipment (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 watts) whereas pico BS, femto BS, and relays may have a lower transmit power level (e.g., 1 watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16 . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
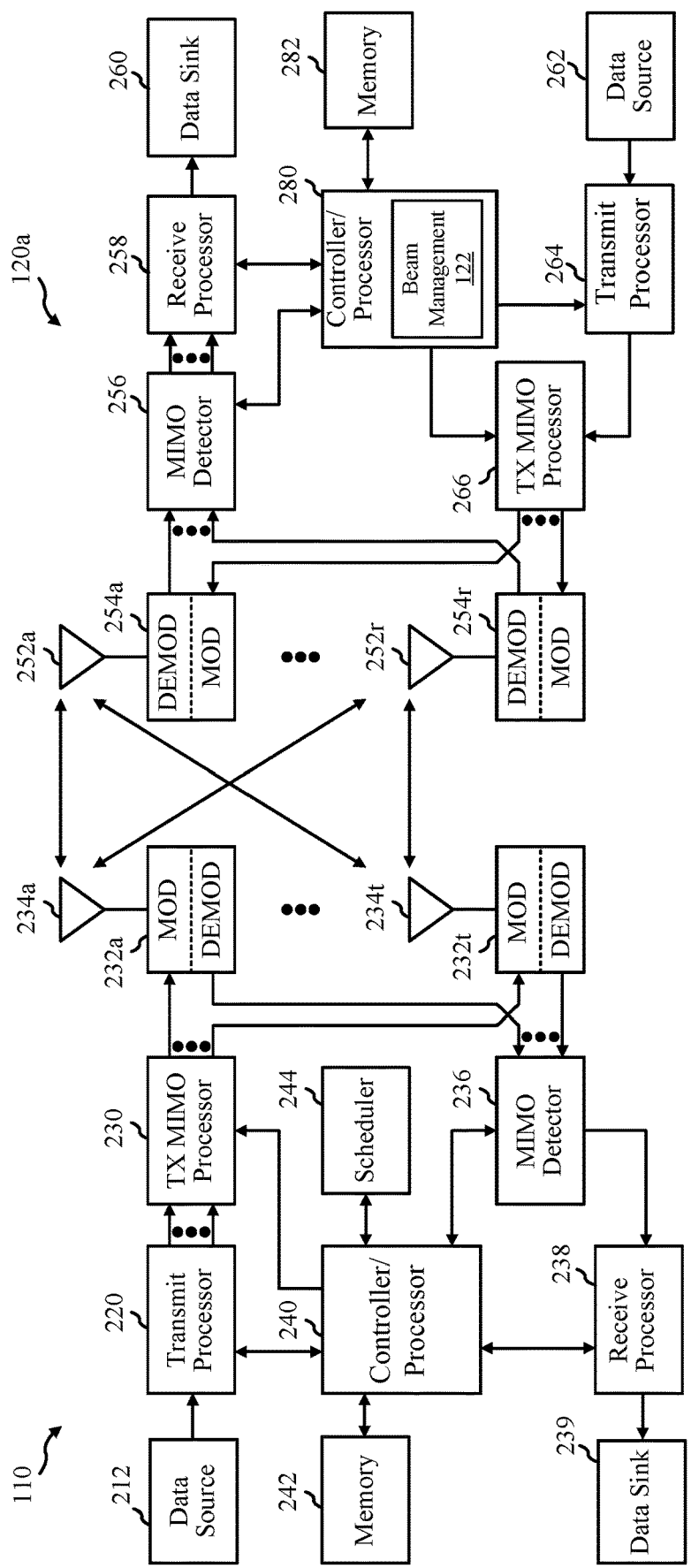
FIG. 2 is a block diagram conceptually illustrating a design of an example base station (BS) and user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. As shown, a user equipment (UE) 120*a* may be communicating with a BS 110 (e.g., one of the first BS 110*a* or the second BS 110*b*).

As shown in FIG. 2, the controller/processor 280 of the UE 120*a* has a beam management 122 module that may be configured for selecting, for each of a plurality of synchronization signal blocks (SSBs) of a synchronization signal (SS) burst set, one corresponding receive beam of a plurality of receive beams of the UE, and monitoring, at each of the plurality of SSBs, for at least one synchronization signal transmitted by at least one BS using the corresponding selected receive beam, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
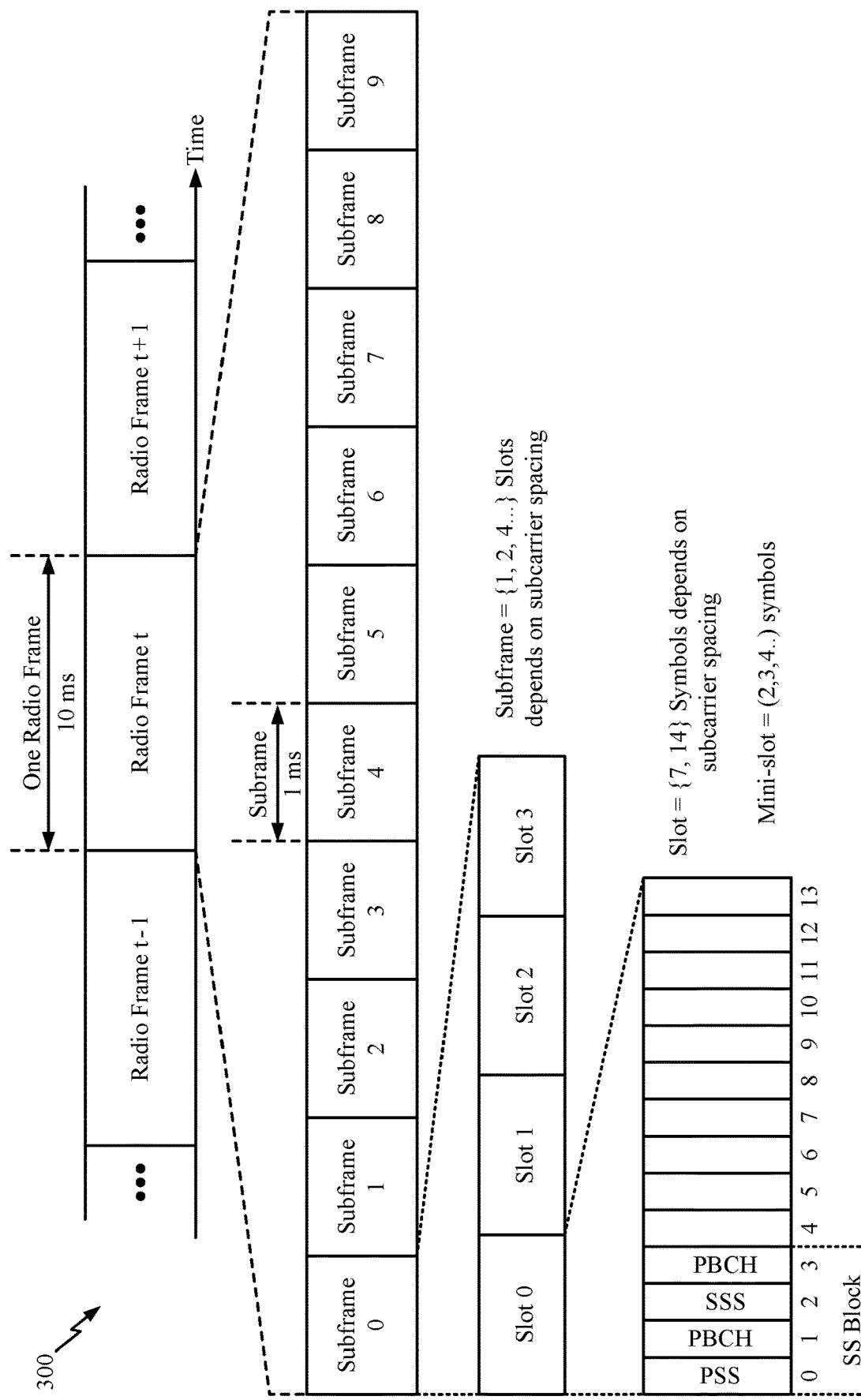
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

Each symbol in a slot may indicate a link direction (e.g., downlink, uplink, or flexible) for data transmission and the link direction for each subframe may be dynamically switched. The link directions may be based on the slot format. Each slot may include downlink/uplink data as well as downlink/uplink control information.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacing, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 4:
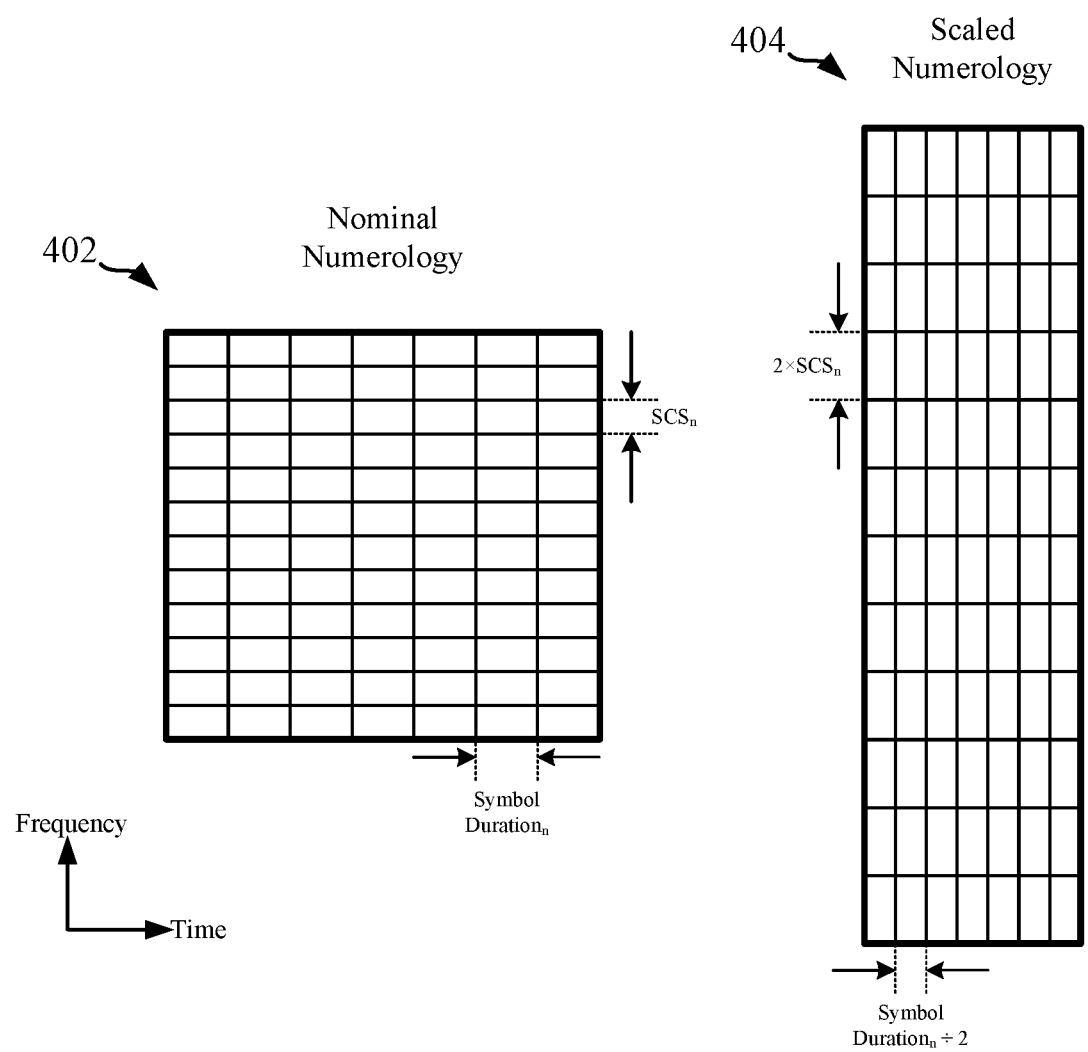
FIG. 4 is a diagram illustrating a first resource block (RB) having a nominal numerology, and a second RB having a scaled numerology, in accordance with certain aspects of the present disclosure.

To illustrate this concept of a scalable numerology, FIG. 4 shows a first resource block (RB) 402 having a nominal numerology, and a second RB 404 having a scaled numerology. Generally, an RB relates to a block of REs that contain any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that an RB corresponds to a single direction of communication (either transmission or reception for a given device).

As one example, the first RB 402 may have a 'nominal' subcarrier spacing ($SCS_n$) of 120 kHz, and a 'nominal' symbol duration of 8.9 μs. Here, in the second RB 304, the scaled numerology includes a scaled SCS of double the nominal SCS, or $2 \times SCS_n = 240$ kHz. Because this provides twice the bandwidth per symbol, it results in a shortened symbol duration to carry the same information. Thus, in the second RB 404, the scaled numerology includes a scaled symbol duration of half the nominal symbol duration, or (symbol duration)÷2=4.5 μs.

Example Ss Burst Set Configuration

Figure 5:
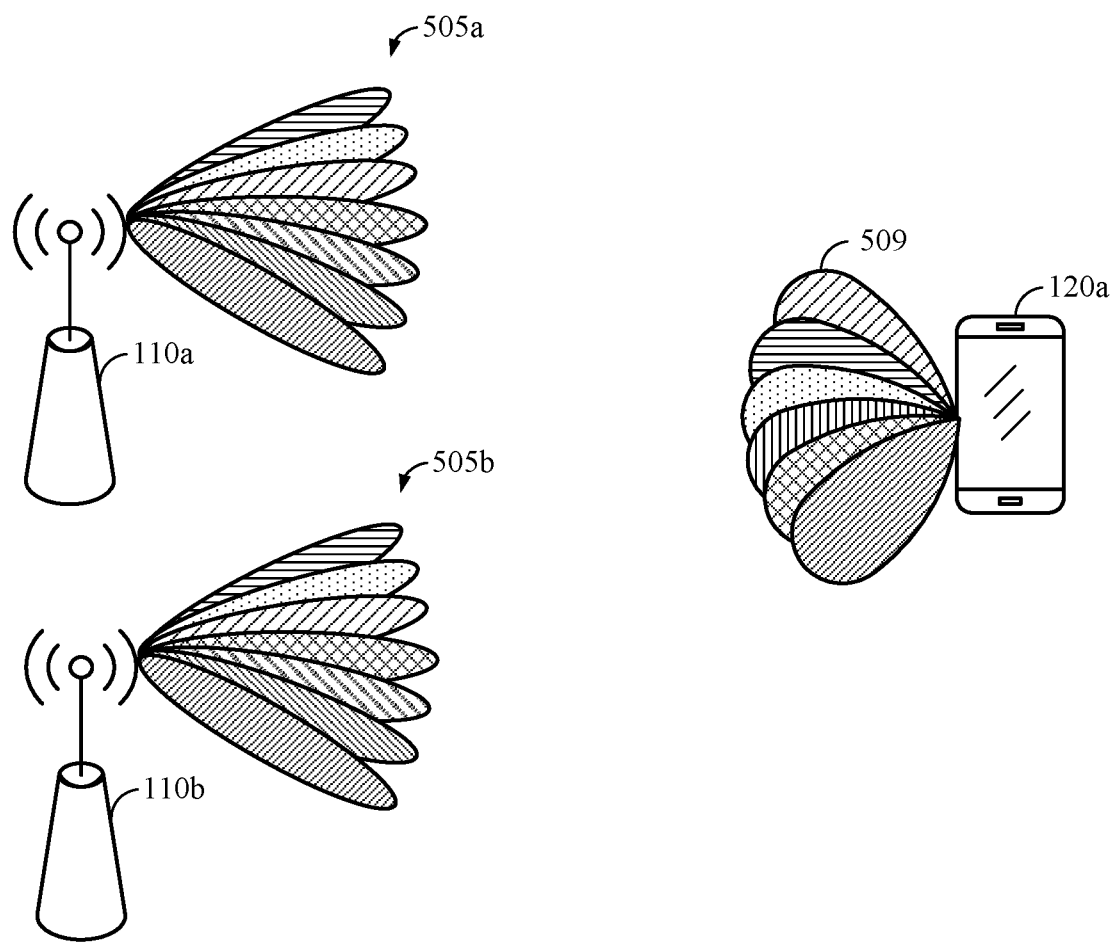
FIG. 5 illustrates example beamformed transmission by a serving cell BS and a neighbouring cell BS, and beamformed reception by a UE, in accordance with certain aspects of the present disclosure.

FIG. 5 illustrates example beamformed transmission by BSs (e.g., a first BS 110a and a second BS 110b of FIG. 1) and beamformed reception by a UE (e.g., UE 120a of FIG. 1). As shown, each of the first BS 110a and the second BS 110b transmits over a plurality of transmit beams 505a and 505b, respectively. Further, UE 120a receives over a plurality of receive beams 509. In certain aspects the receive beams 509 are psuedo omni (PO) beams (e.g., that cover a 90 degree angle in space in three dimensions). For example, each of the first BS 110a and the second BS 110b may transmit an SS burst set, with each SSB of the SS burst set transmitted over a corresponding transmit beam during scheduled time periods. For example, the first BS 110a and the second BS 110b may each transmit 64 SSBs in different beams within an SS burst set scheduled time period. Accordingly, UE 120a may use a scheduled time period as a search opportunity and uses one of its receive beams 509 to receive the synchronizations signals transmitted during the scheduled time period according to a prioritized scheduling according to aspects disclosed herein. Based on the received synchronization signals, such as over multiple search opportunities, UE 120a may determine to communicate with a BS 110 that transmitted a particular synchronization signal (e.g., that meets a criteria as discussed) in the cell in which the synchronization signal was transmitted using the transmit-receive beam pair over which the synchronization signal was transmitted by the BS 110 and received by UE 120a.

As discussed, for UE 120a to communicate in a wireless communication network, such as wireless communication network 100, it communicates with a BS 110. Further, as discussed, the UE 120a may determine which BS 110 to communicate with based on synchronization signals received from the BSs. Accordingly, a BS 110 may transmit synchronization signal blocks (SSBs) (e.g., including one or more synchronization signals such as a primary synchronization signal (PSS) and secondary synchronization signal (SSS) along with PBCH). In certain aspects, the BS 110 may support beamforming to spatially beamform and transmit signals as different transmit beams in different spatial directions. Accordingly, the BS 110 may need to perform beam sweeping and transmit SSBs over each of the beams in order to cover the cell of the BS 110.

Figure 6A:
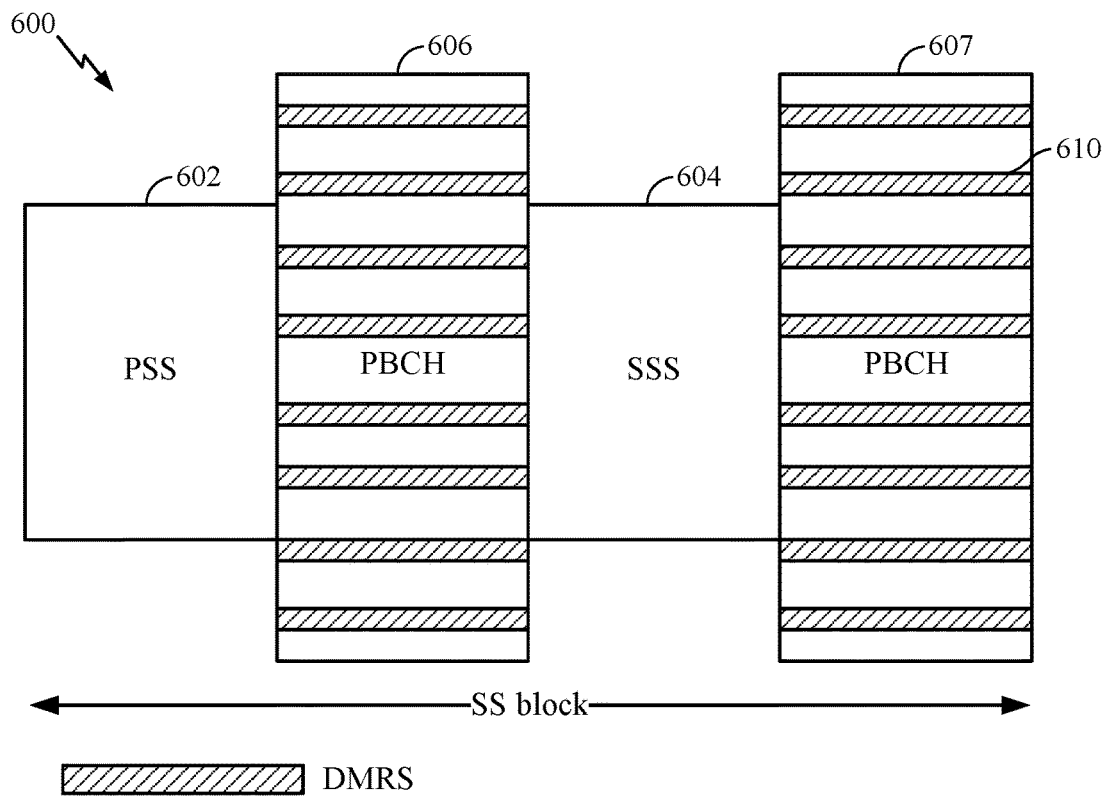
FIG. 6A illustrates an example of a synchronization signal block (SSB), in accordance with aspects of the present disclosure.

FIG. 6A illustrates an example of an SSB 600, in accordance with certain aspects. The X-axis in the illustration of FIG. 6A indicates time (e.g., symbols), and the Y-axis indicates frequency (e.g., tones). As shown, SSB 600 includes a PSS 602, a SSS 604, a PBCH 606, and a PBCH 607 multiplexed in the time domain and allocated to certain frequency ranges. In certain aspects, the PSS 602 and SSS 604 are allocated to the same frequency range. Further, in certain aspects, the PBCH 606 and PBCH 607 are allocated to the same frequency range. In certain aspects, the PSS 602 and SSS 604 are allocated to a portion (e.g., half) of the frequency range of the PBCH 606 and PBCH 607. Though shown in a particular order in SSB 600 and of particular durations and frequency allocations, it should be noted that the order, durations, and frequency allocations of the PSS 602, SSS 604, PBCH 606, and PBCH 607 may be different. Further, the SSB 600 may include additional or fewer reference signals or additional or fewer PBCH. Further, in certain aspects, for each of PBCH 606 and PBCH 607, certain portions (e.g., frequency ranges, tones, resource elements (REs)) are allocated to transmission of reference sequences, such as in demodulation reference signal (DMRS) 610. In certain aspects, the allocation may be different than shown in FIG. 6A.

In certain aspects, multiple SSBs may be assigned to a set of resources to transmit the multiple SSBs (such a set of resources for transmitting multiple SSBs may be referred to herein as a SS burst set). The multiple SSBs may be assigned to periodic resources (e.g., every 20 ms) and transmitted periodically by a BS (e.g., BS 110 of FIG. 1) in a cell. For example, a SS burst set may include a number L of SSBs (e.g., 4, 8, or 64). In certain aspects the number L of SSBs included in a SS burst set is based on the frequency band used for transmission. For example, for sub 6 GHz frequency transmissions, L may equal 4 or 8 (e.g., 0-3 GHz L=4, 3-6 GHz L=8). In another example, for transmission above 6 GHz, L may equal 64. For example, transmission by the BS 110 in a cell may be beamformed, so that each transmission only covers a portion of the cell. Therefore, different SSBs in a SS burst set may be transmitted in different directions on different transmit beams so as to cover the cell. The number L of SSBs in a SS burst set may represent a maximum allowed number of SSBs that can be transmitted within the SS burst set. In other words, the BS 110 may have flexibility in terms of which SSBs are actually transmitted. For example, a BS 110 operating in a frequency band above 6 GHz may have opportunity to transmit up to 64 SSBs within the SS burst set, but the BS 110 may transmit fewer than the allocated possible 64 SSBs.

Figure 6B:
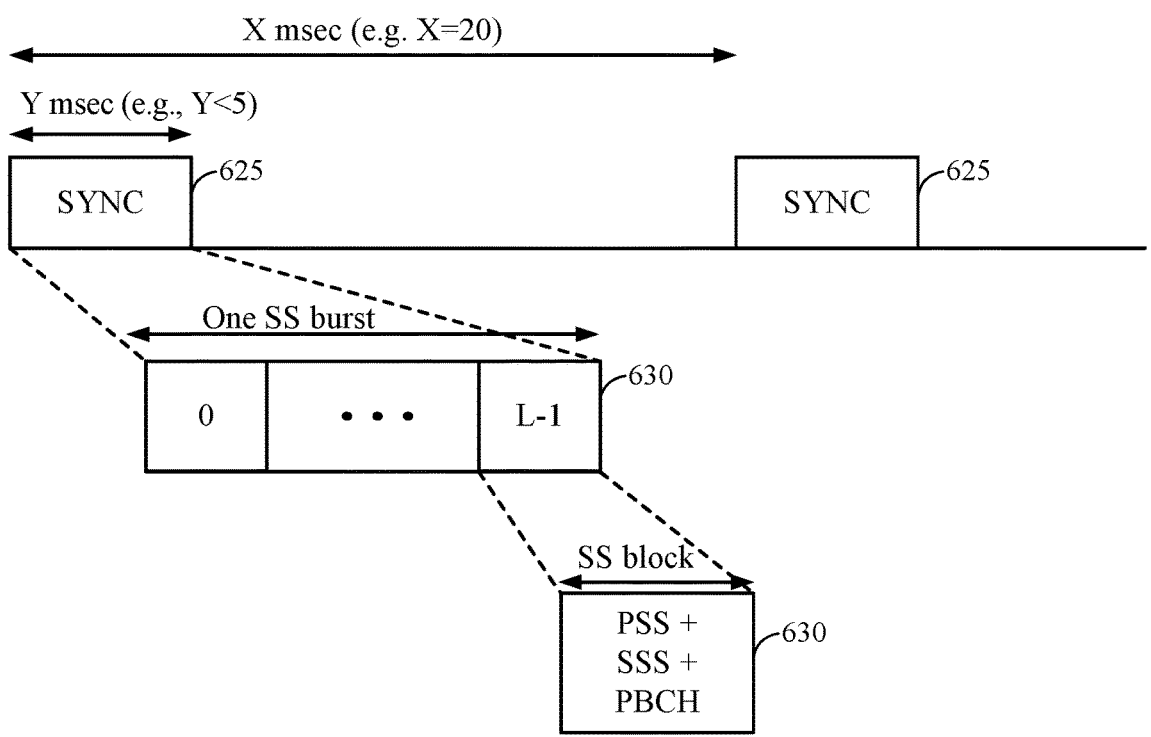
FIG. 6B illustrates an example of the timing of transmission of SSBs, in accordance with aspects of the present disclosure.

FIG. 6B illustrates an example of the timing of transmission of SSBs, in accordance with certain aspects. As shown, a SS burst set 625 may be transmitted periodically every X msec (e.g., X=20). Further, the SS burst set 625 may have a duration of Y msec (e.g., Y<5), wherein all of the SSBs 630 in the SS burst set 625 are transmitted within the duration Y. As shown in FIG. 6B, each SSB 630 includes a PSS, SSS, and PBCH. SSB 630 may for example, correspond to a SSB 600. SS burst set 625 includes a maximum of L SSBs 630 each having a corresponding SSB index (e.g., 0 through L−1) indicating its location within the SS burst set, e.g. indicating the physical transmission ordering in time of the SSBs 630. Though the SSBs 630 are shown allocated in time consecutively in SS burst set 625, it should be noted that the SSBs 630 may not be allocated consecutively. For example, there may be separation in time (e.g., of the same or different durations) between the SSBs 630 in the SS burst set 625. The allocation of time of the SSBs 630 may correspond to a particular pattern, which may be known to the BS 110 and UE (e.g., UE 120 of FIG. 1).

As discussed, UE 120 may have a number of search opportunities scheduled in which it can receive the one or more synchronization signals, and certain aspects provide for determining which receive beam to use for each given search opportunity. In certain aspects, each search opportunity corresponds to timing of a different SS burst set transmitted by one or more BSs 110 (e.g., the SS burst sets from different BSs 110 may be scheduled at the same time). Accordingly, in certain aspects, during a search opportunity, UE 120 receives SS burst sets transmitted from one or more BSs 110, each SS burst set including one or more synchronization signals transmitted over one or more transmit beams, as discussed.

In certain aspects, a UE 120 may be configured to determine signal power, signal strength, signal quality, and/or signal interference by measuring on one or more SSBs in an SS burst set. In one example, the UE 120 may calculate a synchronization signal reference signal received power (SS-RSRP) by determining linear average over the power contributions of a resource element that carries the SSS. In another example, the UE 120 may calculate an SS signal-to-noise and interference ratio (SS-SINR) by determining the linear average over the power contribution of the resource elements carrying SSS divided by the linear average of the noise and interference power contribution over the resource elements carrying SSS within the same frequency bandwidth. It should be noted that any other suitable signal characteristics may be measured using one or more resource elements of an SSB.

Conventionally, a UE 120 may be configured to measure on signalling received from a BS 110 by selecting one corresponding receive beam and fixing the selected beam for the whole duration of an SS burst set. In such a configuration, the UE 120 only selects a new receive beam after the SS burst set and in preparation for another SS burst set. As with the initial SS burst set, the UE 120 may fix the newly selected receive beam for the whole duration of the following SS burst set. That is, the UE 120 only changes beams once for each SS burst set.

However, because there can be up to 64 SSBs in a single SS burst set (i.e., there are 64 SSS resource elements for the UE 120 to measure on), the UE 120 may be foregoing additional opportunities for beam measurement if it fixes it's receive beam for the duration of the SS burst set. For example, when the UE 120 receive beam is fixed per SS burst set, only the beam pair link associated with the current UE receive beam can be measured. Moreover, the conventional method may require many cycles of SS burst sets for a UE 120 to measure on all beams of a serving cell and a neighbouring cell.

Thus, a method of providing the UE 120 with an ability to measure on multiple SSBs in a single SS burst set would provide the UE 120 with more measurement opportunities, reduce delays associated with measurements, improve tracking of serving cell and neighbour cell signal quality, and improve mobility performance.

Example Beam Switching for Receiving Multiple SSBs in an Ss Burst Set

Figure 7:
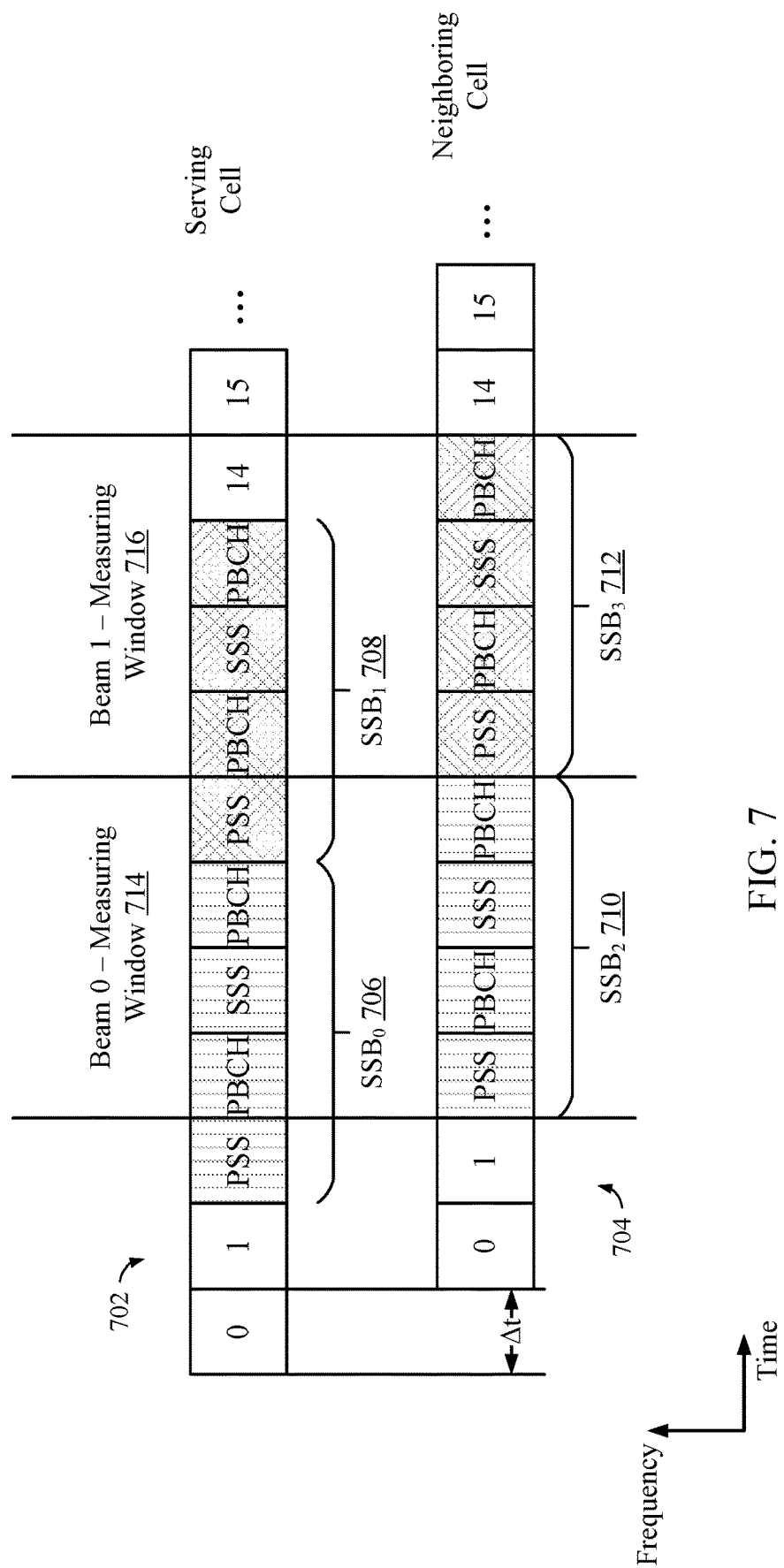
FIG. 7 illustrates first SS burst set and a second SS burst set, in accordance with aspects of the present disclosure.

FIG. 7 illustrates a series of contiguous resource elements corresponding to a first SS burst set 702 transmitted from a first BS (e.g., BS 110*a* of FIG. 1) of a serving cell (e.g., cell 102*a* of FIG. 1), and a second series of contiguous resource elements corresponding to a second SS burst set 704 transmitted from a second BS (e.g., BS 110*b* of FIG. 1) of a neighbouring cell (e.g., cell 102*b* of FIG. 1). The sub-carrier spacing (SCS) of both the first SS burst set 702 and the second SS burst set 704 may be the same, and may correspond to any suitable SCS. However, in this example, SCS may be 120 kHz. It should be noted that the first BS 110*a* and the second BS 110*b* are part of a synchronized network. As such, the timing of the first BS 110*a* and the second BS 110*b* may not be fully aligned, as illustrated by the timing offset (Δt).

The first SS burst set 702 includes a first SSB 706 and a second SSB 708, while the second SS burst set 704 includes a third SSB 710 and a fourth SSB 712. Each SSB is shown as including a primary synchronization signal (PSS), a physical broadcast channel (PBCH), a secondary synchronization signal (SSS), and another PBCH. It should be noted that in certain embodiments, one or more of the first SS burst set 702 and the second SS burst set 704 may include SSBs in addition to those shown. For example, a single SS burst set may include 64 SSBs.

In certain aspects, a UE (e.g., UE 120*a* of FIG. 1) may be configured to determine a timing offset between the first SS burst set 702 and the second SS burst set 704. In the example of FIG. 7, the timing offset may be less than or equal to one symbol. In some examples, the UE 120*a* may determine whether the timing offset is less than or equal to a threshold value. In one example, the threshold value may be equal to 1 symbol, or 8.9 us. As noted above, a synchronized network may not be fully aligned. Thus, determining the timing offset allows the UE 120*a* to determine whether it can measure on one or more SSBs of an SS burst set from more than one BS. For example, in order to measure on SSBs from more than one BS, the UE 120*a* must determine whether the SSS symbol of the first SSB 706 is within a first beam measuring window 714 of time as the SSS symbol of the second SSB 710.

The beam measuring window takes into account the timing offset between the first BS 110*a* and the second BS 110*b*, as well as any delay on the UE 120*a* side (e.g., beam switching and beam propagation delays) to provide the UE with enough time to measure on each SSB of two or more SS burst sets. Accordingly, the threshold value may indicate a ceiling timing offset that will provide the UE 120*a* with enough time to switch beams for each SSB of two or more BSs. For example, if the timing offset is less than or equal to the threshold value, then the UE 120*a* will be capable of measuring the first SSB 706 and the third SSB 710 using a first receive beam, and switching to a second receive beam and measuring the second SSB 708 and the fourth SSB 712 using the second receive beam.

If, however, the timing offset is greater than the threshold value, then the UE 120*a* may switch receive beams for every X number of SSBs, where X is an integer (e.g., the UE 120*a* may only switch the receive beam once every two SSBs in the SS burst set).

In certain aspects, the UE 120*a* is configured to select one corresponding receive beam for each of a plurality of SSBs in an SS burst set, and monitor for at least one synchronization signal transmitted by one or more BSs using the corresponding selected receive beam. That is, in some examples, the UE 120*a* may select a first receive beam (e.g., beam 0) for the first SSB 706 and the third SSB 710, and use the first receive beam to receive, during the first measuring window 714, an SSS corresponding to each of the first SSB 706 and the third SSB 710. The UE 120*a* may then select a second receive beam (e.g., beam 1) for the second SSB 708 and the fourth SSB 712, and use the second receive beam to receive, during the second measuring window 716, an SSS corresponding to each of the second SSB 708 and the fourth SSB 712.

In certain aspects, as noted above, the UE 120*a* may be configured to measure signal quality based on an SSS of each SSB received by the UE 120*a* via the selected receive beams.

Figure 8:
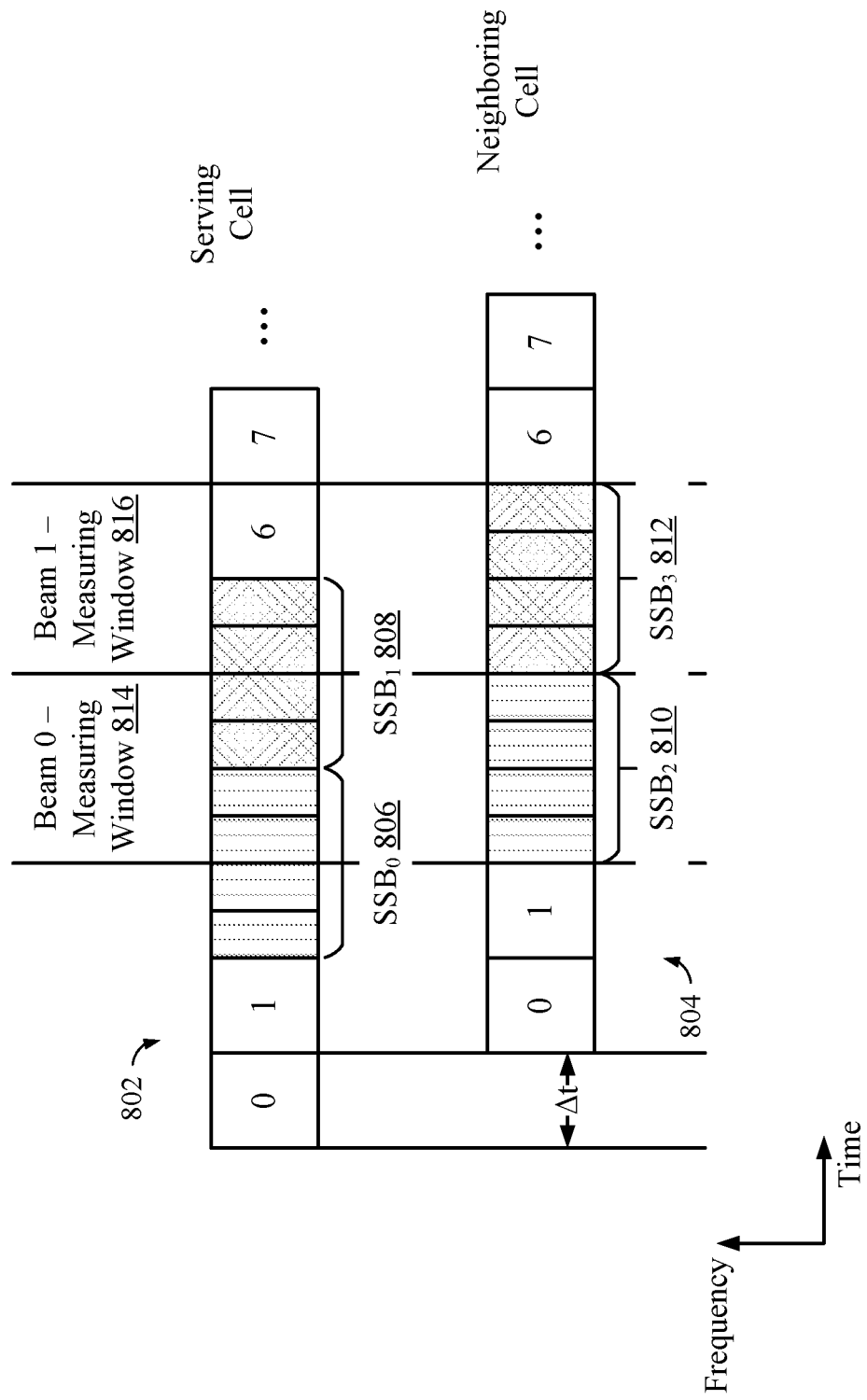
FIG. 8 illustrates first SS burst set and a second SS burst set, in accordance with aspects of the present disclosure.

FIG. 8 illustrates a series of contiguous resource elements corresponding to a first SS burst set 802 transmitted from a first BS (e.g., BS 110*a* of FIG. 1) of a serving cell (e.g., cell 102*a* of FIG. 1), and a second series of contiguous resource elements corresponding to a second SS burst set 804 transmitted from a second BS (e.g., BS 110*b* of FIG. 1) of a neighbouring cell (e.g., cell 102*b* of FIG. 1). FIG. 8 is similar to FIG. 7 above; however, the sub-carrier spacing (SCS) of both the first SS burst bust 802 and the second SS burst set 804 corresponds to 240 kHz.

Similar to FIG. 7, the first SS burst set 802 includes a first SSB 806 and a second SSB 808, while the second SS burst set 804 includes a third SSB 810 and a fourth SSB 812. Each SSB is shown as including a primary synchronization signal (PSS), a physical broadcast channel (PBCH), a secondary synchronization signal (SSS), and another PBCH. It should be noted that in certain embodiments, one or more of the first SS burst set 802 and the second SS burst set 804 may include SSBs in addition to those shown. For example, a single SS burst set may include 64 SSBs.

In certain aspects, a UE (e.g., UE 120a of FIG. 1) may be configured to determine a timing offset (Δt) between the first SS burst set 802 and the second SS burst set 804. In the example of FIG. 8, the timing offset may be less than or equal to two symbols (where each symbol is approximately 4.5 us) to ensure that an SSS can be detected by the UE 120a from each of the serving cell and the neighbour cell during a single measuring window (e.g., a first measuring window 814 and a second measuring window 816).

Figure 9:
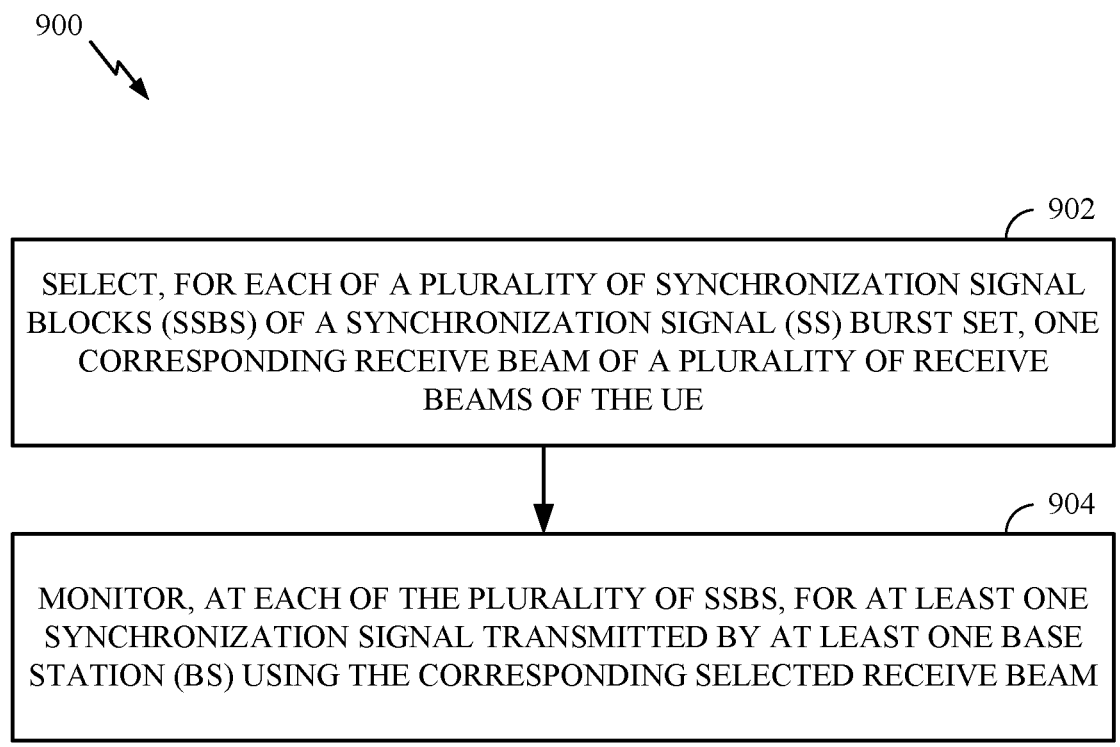
FIG. 9 is a flow diagram illustrating example operations for wireless communication, in accordance with certain aspects of the present disclosure.

FIG. 9 is a flow diagram illustrating example operations 900 for wireless communication, in accordance with certain aspects of the present disclosure. The operations 900 may be performed, for example, by a UE (e.g., such as a UE 120 in the wireless communication network 100). Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at a first block 902, by selecting, for each of a plurality of synchronization signal blocks (SSBs) of a synchronization signal (SS) burst set, one corresponding receive beam of a plurality of receive beams of the UE.

The operations 900 may proceed to a second block 904, by monitoring, at each of the plurality of SSBs, for at least one synchronization signal transmitted by at least one base station (BS) using the corresponding selected receive beam.

In certain aspects, the operations 900 may be configured for receiving at a first SSB of the plurality of SSBs a first synchronization signal from a first BS using a first receive beam, and receiving at a second SSB of the plurality of SSBs a second synchronization signal from a second BS using a second receive beam.

In certain aspects, the operations 900 may be configured for measuring a signal quality based on the first synchronization signal, and measuring a signal quality based on the second synchronization signal.

In certain aspects, the operations 900 may be configured for receiving, at a first SSB of the plurality of SSBs, a first synchronization signal from a first BS and a second synchronization signal from a second BS.

In certain aspects, the operations 900 may be configured for measuring a signal quality based on the first synchronization signal, and measuring a signal quality based on the second synchronization signal.

In certain aspects, the operations 900 may be configured for determining a time offset between a first communication timing associated with a first BS and a second communication timing associated with a second BS, and determining whether the time offset is less than a threshold value, wherein selecting, for each of the plurality of synchronization signal blocks SSBs, one corresponding receive beam is based on whether the time offset is less-than or equal-to the threshold value.

In certain aspects, when the time offset is less-than or equal-to the threshold value, at least two consecutive SSBs of the plurality of SSBs have different receive beams selected.

In certain aspects, when the time offset is greater than the threshold value, at least two SSBs of the plurality of SSBs in separate slots that are separated by a single slot have different receive beams selected.

In certain aspects, the threshold value is 1 symbol.

In certain aspects, the plurality of synchronization signal blocks (SSBs) of the synchronization signal (SS) burst set are ordered in a contiguous series of SSBs in time.

Figure 10:
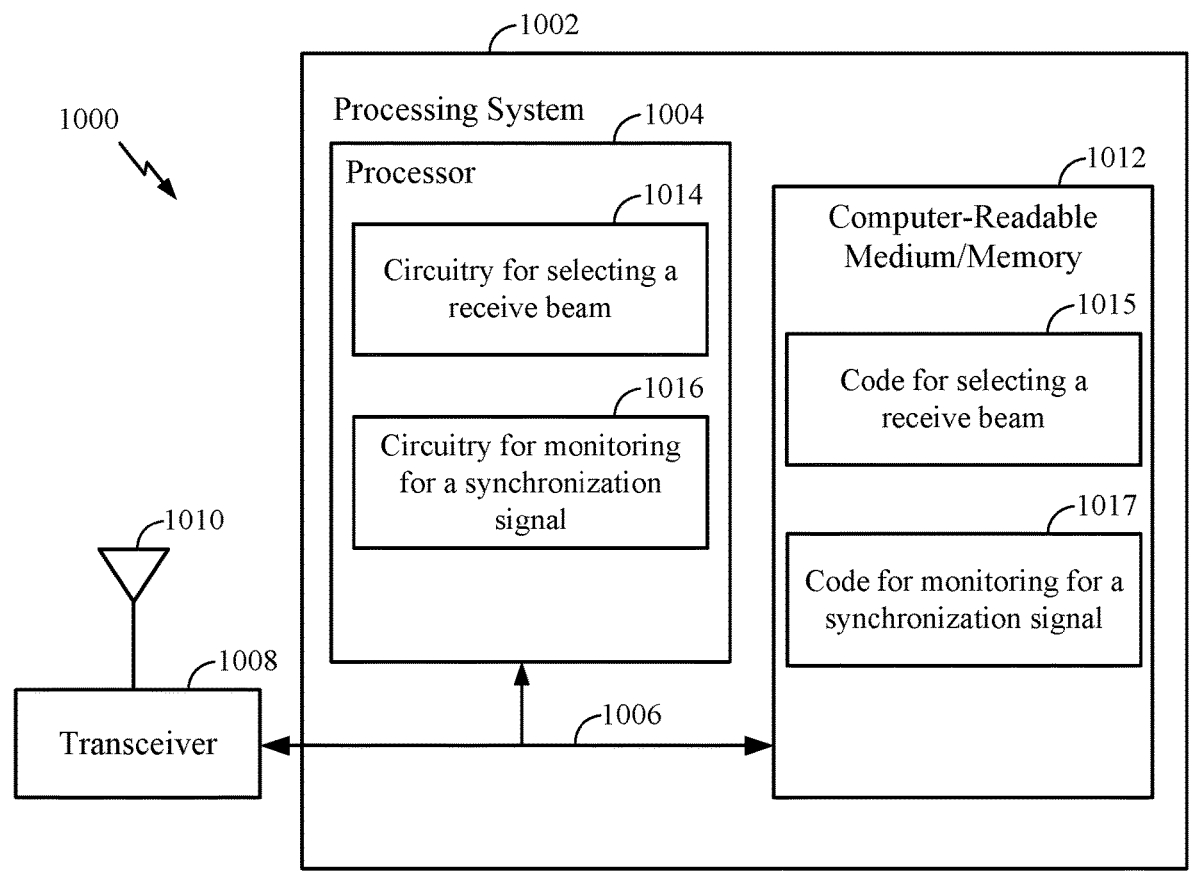
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 9. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 9, or other operations for performing the various techniques discussed herein for receive beam switching on a per-SSB basis. In certain aspects, computer-readable medium/memory 1012 stores code 1015 for selecting a receive beam, and code 1017 for monitoring for a synchronization signal. In certain aspects, the processor 1004 has circuitry configured to implement the code stored in the computer-readable medium/memory 1012. The processor 1004 includes circuitry 1014 for selecting a receive beam, and circuitry 1016 for monitoring for a synchronization signal.

ADDITIONAL CONSIDERATIONS

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication at a user equipment (UE), comprising:
    selecting, for each of a plurality of synchronization signal blocks (SSBs) of a synchronization signal (SS) burst set, one corresponding receive beam of a plurality of receive beams of the UE; and
    monitoring, at each of the plurality of SSBs, for at least one synchronization signal transmitted by at least one base station (BS) using the corresponding selected receive beam.

2. The method of claim 1, further comprising:
    receiving at a first SSB of the plurality of SSBs a first synchronization signal from a first BS using a first receive beam; and
    receiving at a second SSB of the plurality of SSBs a second synchronization signal from a second BS using a second receive beam.

3. The method of claim 2, further comprising:
    measuring a signal quality based on the first synchronization signal; and
    measuring a signal quality based on the second synchronization signal.

4. The method of claim 1, further comprising receiving, at a first SSB of the plurality of SSBs, a first synchronization signal from a first BS and a second synchronization signal from a second BS.

5. The method of claim 4, further comprising:
    measuring a signal quality based on the first synchronization signal; and
    measuring a signal quality based on the second synchronization signal.

6. The method of claim 1, further comprising:
    determining a time offset between a first communication timing associated with a first BS and a second communication timing associated with a second BS; and
    determining whether the time offset is less than a threshold value, wherein selecting, for each of the plurality of synchronization signal blocks SSBs, one corresponding receive beam is based on whether the time offset is less-than or equal-to the threshold value.

7. The method of claim 6, wherein when the time offset is less-than or equal-to the threshold value, at least two consecutive SSBs of the plurality of SSBs have different receive beams selected.

8. The method of claim 7, wherein when the time offset is greater than the threshold value, at least two SSBs of the plurality of SSBs in separate slots that are separated by a single slot have different receive beams selected.

9. The method of claim 6, wherein the threshold value is 1 symbol.

10. The method of claim 1, wherein the plurality of synchronization signal blocks (SSBs) of the synchronization signal (SS) burst set are ordered in a contiguous series of SSBs in time.

11. A user equipment (UE), comprising:
    a memory; and
    a processor communicatively coupled to the memory, wherein the processor is configured to:
        select, for each of a plurality of synchronization signal blocks (SSBs) of a synchronization signal (SS) burst set, one corresponding receive beam of a plurality of receive beams of the UE; and
        monitor, at each of the plurality of SSBs, for at least one synchronization signal transmitted by at least one base station (BS) using the corresponding selected receive beam.

12. The UE of claim 11, wherein the processor is further configured to:
    receive at a first SSB of the plurality of SSBs a first synchronization signal from a first BS using a first receive beam; and
    receive at a second SSB of the plurality of SSBs a second synchronization signal from a second BS using a second receive beam.

13. The UE of claim 12, wherein the processor is further configured to:
    measure a signal quality based on the first synchronization signal; and
    measure a signal quality based on the second synchronization signal.

14. The UE of claim 11, wherein the UE is further configured to receive, at a first SSB of the plurality of SSBs, a first synchronization signal from a first BS and a second synchronization signal from a second BS.

15. The UE of claim 14, wherein the processor is further configured to:

measure a signal quality based on the first synchronization signal; and measure a signal quality based on the second synchronization signal.

16. The UE of claim 11, wherein the UE is further configured to:

determine a time offset between a first communication timing associated with a first BS and a second communication timing associated with a second BS; and determine whether the time offset is less than a threshold value, wherein selecting, for each of the plurality of synchronization signal blocks SSBs, one corresponding receive beam is based on whether the time offset is less-than or equal-to the threshold value.

17. The UE of claim 16, wherein when the time offset is less-than or equal-to the threshold value, at least two consecutive SSBs of the plurality of SSBs have different receive beams selected.

18. The UE of claim 17, wherein when the time offset is greater than the threshold value, at least two SSBs of the plurality of SSBs in separate slots that are separated by a single slot have different receive beams selected.

19. The UE of claim 16, wherein the threshold value is 1 symbol.

20. The UE of claim 1, wherein the plurality of synchronization signal blocks (SSBs) of the synchronization signal (SS) burst set are ordered in a contiguous series of SSBs in time.

21. An apparatus for wireless communication, comprising:

means for selecting, for each of a plurality of synchronization signal blocks (SSBs) of a synchronization signal (SS) burst set, one corresponding receive beam of a plurality of receive beams of the UE; and means for monitoring, at each of the plurality of SSBs, for at least one synchronization signal transmitted by at least one base station (BS) using the corresponding selected receive beam.

22. The apparatus of claim 21, further comprising:

means for receiving at a first SSB of the plurality of SSBs a first synchronization signal from a first BS using a first receive beam; and means for receiving at a second SSB of the plurality of SSBs a second synchronization signal from a second BS using a second receive beam.

23. The apparatus of claim 22, further comprising:

means for measuring a signal quality based on the first synchronization signal; and means for measuring a signal quality based on the second synchronization signal.

24. The apparatus of claim 21, further comprising means for receiving, at a first SSB of the plurality of SSBs, a first synchronization signal from a first BS and a second synchronization signal from a second BS.

25. The apparatus of claim 24, further comprising:

means for measuring a signal quality based on the first synchronization signal; and means for measuring a signal quality based on the second synchronization signal.

26. The apparatus of claim 21, further comprising:

means for determining a time offset between a first communication timing associated with a first BS and a second communication timing associated with a second BS; and means for determining whether the time offset is less than a threshold value, wherein selecting, for each of the plurality of synchronization signal blocks SSBs, one corresponding receive beam is based on whether the time offset is less-than or equal-to the threshold value.

27. The apparatus of claim 26, wherein when the time offset is less-than or equal-to the threshold value, at least two consecutive SSBs of the plurality of SSBs have different receive beams selected.

28. The apparatus of claim 27, wherein when the time offset is greater than the threshold value, at least two SSBs of the plurality of SSBs in separate slots that are separated by a single slot have different receive beams selected.

29. The apparatus of claim 26, wherein the threshold value is 1 symbol.

30. A non-transitory computer-readable storage medium that stores instructions that when executed by a processor of an apparatus cause the apparatus to perform a method of wireless communication, comprising:

selecting, for each of a plurality of synchronization signal blocks (SSBs) of a synchronization signal (SS) burst set, one corresponding receive beam of a plurality of receive beams of the UE; and monitoring, at each of the plurality of SSBs, for at least one synchronization signal transmitted by at least one base station (BS) using the corresponding selected receive beam.

* * * * *